United States Patent Office 3,850,848
Patented Nov. 26, 1974

3,850,848
PACKING MATERIAL FOR USE IN GEL PERMEATION CHROMATOGRAPHY AND METHOD OF MANUFACTURING THE SAME
Nobuyuki Baba, Kyoto, and Shozo Sato, Yamato, Japan, assignors to Mitsubishi Kasei Kogyo Kabushiki Kaisha (also known as Mitsubishi Chemical Industries Limited), Tokyo, Japan
Filed July 20, 1972, Ser. No. 273,460
Claims priority, application Japan, July 31, 1971, 46/57,608
Int. Cl. B01p 11/06
U.S. Cl. 252—463                                      8 Claims

ABSTRACT OF THE DISCLOSURE

A packing material for use in gel permeation chromatography comprising zinc spinel or zinc spinel containing η-alumina and having an appropriate particle size and a sharp pore size distribution peak is prepared by treating a mixed solution of a zinc salt and an aluminum salt of a monobasic acid selected from the group consisting of chloride and nitrate of the metals with a solution of an acid carbonate selected from the group consisting of ammonium hydrogen carbonate and sodium hydrogen carbonate to precipitate alumina hydroxide and zinc hydroxide gels and then aging the precipitate.

BACKGROUND OF THE INVENTION

This invention relates to a column packing material for use in gel permeation chromatography and a method of manufacturing the same, and more particularly to a column packing material for use in gel permeation chromatography having uniform pore size and an appropriate particle size and a method of manufacturing the same.

Heretofore porous silica beads, glass beads or cross-linked polystyrene have been used as the column packing material for use in gel permeation chromatography (hereinafter, for the sake of brevity, abbreviated as GPC) but it has been difficult to obtain such column packing materials having uniform pore size and desired particle size so that it was impossible to completely separate a substance to be examined.

More particularly, in the case of silica beads and glass beads, it was difficult to adjust the pore size, whereas in the case of polystyrene, it was possible to obtain only column packing materials having a relatively broad pore size distribution. Moreover, where a polystyrene column packing material is used difficulties are caused by the swelling or shrinkage of the column packing material caused by the solvent used for dissolving the substance to be examined. In addition, where measurements are carried out at elevated temperatures, there arises a problem of decreasing the durability of the column packing material caused by the dissolution of the cross-linked polystyrene.

Although it has been proposed to use alumina as the column packing material for GPC it is difficult to prepare alumina having a small pore size by reason of the limitation caused by the method of preparing such alumina. It is also difficult to efficiently separate substances having low molecular weights, so that the separable range of the molecular weight is limited to from 10,000 to 10,000,000.

SUMMARY OF THE INVENTION

It is an object of this invention to eliminate above described defects of the prior art column packing materials for GPC and to provide a novel packing material for GPC which has excellent stability and small pore size.

Another object of this invention is to provide a novel column packing material for GPC which can separate at a high degree of sharpness polymers having a wide molecular weight distribution.

According to this invention, above described objects can be readily accomplished by providing a column packing material comprising zinc spinel ($ZnAl_2O_4$) or zinc spinel containing alumina and having uniform pore size and a predetermined particle size.

More particularly, the novel column packing material comprises zinc spinel or zinc spinel containing alumina and is prepared by a method to be described in detail hereinafter wherein a mixture of a zinc salt and an aluminum salt of a monobasic acid is used as the raw material and an acid carbonate is used as a precipitant. The resulting column packing material has a pore size of less than 300 A. in radius, a bulk density of from 0.70 to 1.70 g./ml. and a particle size of from 10 to 100 microns. The purity of the column packing material is extremely high.

The zinc spinel has a spinel type crystal structure whereas the alumina is a crystal of η-alumina.

The novel column packing material has the following characteristic features.

(1) The pore size is extremely small, that is, the radius of the pore ranges from 20 to 300 A. which can never be attained by the prior art alumina column packing material. Especially, when the column packing material consists of zinc spinel alone, the radius of the pore is only 40 to 80 A. As a result, it is possible to extend the permeability limit of a column packed with this material to a region of much lower molecular weight, that is to a molecular weight of about 400. It is possible to adjust the pore radius in a wide range by varying the ratio of admixing zinc and aluminum in the raw material.

(2) The pore size distribution curve is extremely sharp thereby providing separation ability or resolving power of high degree.

Since there has been no literature reference directed to the expression of the pore size distribution or the sharpness of the pore size distribution curve we have proposed to express it as follows. The peak of the pore size distribution curve generally has the form of a triangle, so that the sharpness of the triangle can be expressed by the ratio of the length of the bottom side to the pore radius of the peak of the triangle. In the case of a pore size distribution curve, we used the term "bottom extent" instead of the bottom side, the term bottom extent expressing the distance in angstrom units between the points where the two sides of triangle of the pore size distribution curve intersect the abscissa. Supposing a bottom extent of X and a pore radius of the peak r, then the sharpness can be expressed by a ratio $X/r \times 3$, where the multiplying factor 3 is an arbitrarily selected constant. The column packing material of this invention has a ratio of the bottom extent (as above defined) of the sharp portion of the pore size distribution to the distribution peak of less than 5.0, usually less than 3.0. As a consequence, it is possible to attain the desired degree of separation or resolution with a small number of columns. On the other hand, in the prior art cross-linked polystyrene column packing material, since the pore size distribution is relatively broad, the separation ability is low so that it is impossible to increase the separation ability or resolution power even when a plurality of columns are connected in series which requires longer measuring time.

(3) Since the novel column packing material is made of a heat resistant inorganic substance it is possible to use it at elevated temperatures provided that the solvent and the substance to be analyzed are stable at such elevated temperatures.

The particle size of the zinc spinel or the zinc spinel containing alumina, particularly η-alumina is chosen such that the sensitivity of the column is improved in the same manner as in other chromatography wherein it is necessary to use a column packing material of suitable particle size to improve sensitivity. The preferred range of the particle size of the novel column packing material is from 10 to 100 microns, more particularly from 15 to 60 microns, most preferably from 15 to 40 microns.

With regard to the pore size distribution of the zinc spinel or the zinc spinel containing alumina, since it is important to select an appropriate distribution peak and a narrow distribution for efficient separation of solute molecules, such as polymerized substances, it is suitable to employ zinc spinel or zinc spinel containing alumina having a distribution peak of from 20 to 300 angstrom units, preferably from 40 to 200 angstrom units. In this specification, the term "distribution peak" is defined as the pore size (in angstrom units) where the peak in the pore size distribution curve exists. Further, for increasing the sensitivity of GPC, it is necessary to utilize the column packing material having a narrow pore size distribution.

The novel column packing material of this invention can be used in any application of GPC, for example, to measure the molecular weight distribution of various compounds, such as high and low molecular weight substances, for the separation thereof and for biochemical applications according to the conventional methods for GPC.

When used to measure the molecular weight distribution, substances to be detected, for example, polyethylene, polystyrene, polyacrylate, or polyvinylalcohol, are dissolved in a suitable solvent such as tetrahydrofuran, benzene, chloroform, trichlorobenzene, dimethylformamide or water, and the solution is introduced into a column or columns packed with the column packing material of this invention.

Preferably, the concentration of the solution used is generally from about 0.03 to 0.2%, particularly less than 0.1%. Usually, the solution is admitted into a column at a rate of about 0.5 to 1.0 cc./min. For optimum operation, although a temperature of about 25° C. is preferable for the column temperature, this temperature may be elevated to any temperature at which the substance to be analysed is completely dissolved in the solvent used.

The type, combination and number of columns are generally selected dependent upon the width of the molecular weight distribution to be analyzed. For example, to analyze a polymer having a narrow width of molecular weight distribution it is sufficient to use a column packed with a single column packing material comprising zinc spinel or zinc spinel containing alumina, provided that a suitable pore size is selected. This is attributable to the sharp pore size distribution of the novel packing material but it is of course possible to improve the separation ability or resolving power by increasing the number of columns.

On the other hand, in order to analyze polymers having a wide molecular weight distribution, several types of the novel column packing material are prepared and packed in different columns. Alternatively, column packing materials of different types are suitably admixed to obtain desired pore size distribution and the mixture is packed in a single column to cover a wider molecular weight range. Of course, it is possible to use the novel column packing material together with the prior art column packing material to adjust the separation abilities or resolving powers of different columns. This enables the measurement of the distribution of molecular weights varying from low to high molecular weight.

Where a mixture comprising the novel column packing material and an alumina column packing material having a uniform pore size is packed in the same column it is possible to readily solve the problem of increasing the pressure drop across a column, because, when used for GPC, the novel column packing material increases the pressure drop necessary for obtaining a definite flow rate and because it is necessary to use a column of considerable length for the purpose of increasing the separation ability or resolving power in view of a small pore volume.

The alumina that can be admixed with the novel column packing material may be $\theta$-alumina prepared by the steps of hydrolyzing an aluminum salt alone, aging the resulting aluminum hydroxide gel and calcining the aged boehmite at a temperature of from 1050 to 1200° C., the $\theta$-alumina having a pore radius of from 150 to 1,000 A. To prepare a mixed column packing material, a mixture of the novel column packing material and the alumina just described is suspended in a solvent capable of well suspending these column packing materials, such as water, stirring the suspension, filtering, drying under a reduced pressure to completely drive off the solvent remaining in the pores. The resulting mixture is packed in a column for GPC. The ratio of admixing two types of column packing materials is suitably selected so as to produce a linear calibration curve without an inflection at the junction of the two parts of the curve which correspond to the two types of the column packing materials and it is possible to obtain mixtures capable of covering a wide molecular weight distribution ranging from a low molecular weight to a high-molecular weight. Usually, however, a ratio of one part, by weight, of alumina to one part or more, preferably 2 to 5 parts, by weight, of the novel zinc spinel or zinc spinel containing $\eta$-alumina, is preferred.

The novel zinc spinel or zinc spinel containing alumina used as the column packing material for GPC is prepared by the following method. More particularly, a mixture of monobasic salts of zinc and aluminum is used as the raw material and an acid carbonate is used as the precipitant. Use of said raw material and precipitant is essential for the purpose of preventing acid radicals or an alkali from remaining in the product and to obtain column packing materials of high purity. More specifically, respective nitrates or chlorides of zinc and aluminum are generally preferred as the monobasic acid salts of zinc and aluminum but it should be understood that other monobasic acid salts can also be used.

Usually, these raw materials are used in the form of aqueous solutions. It is advantageous to use aqueous solutions of zinc salt and aluminum salt having concentrations of from 1 to 1.5 mol/l. of total metal and to use aqueous solutions of the acid carbonate having concentrations of from 1 to 1.2 mol/l.

As the acid carbonate serving as the precipitant, ammonium bicarbonate is generally preferred, however another acid carbonate such as sodium bicarbonate or the like, can also be used. Usually, an aqueous solution of ammonium bicarbonate or sodium bicarbonate whose pH has been adjusted to be less than 7.5 by causing it to absorb carbon dioxide gas is used. An aqueous solution of ammonium bicarbonate may be prepared by dissolving ammonium bicarbonate in water or by causing an aqueous solution of ammonia or ammonium carbonate to absorb carbon dioxide gas.

Upon incorporation of an aqueous solution of an acid carbonate into respective aqueous solutions of a zinc salt and an aluminium salt, the zinc salt and aluminum salt undergo hydrolysis thus forming a gel of a mixture of zinc hydroxide [$Zn(OH)_2$] and aluminum hydroxide [$Al(OH)_3$]. The quantity of the precipitant incorporated is 10 to 40% excess, preferably 20 to 30% excess of the theoretical value with reference to the raw material. In order to obtain zinc spinel or zinc spinel containing alumina and having a high purity and especially uniform pore size it is advantageous to age the above described gel of the hydroxides by heating it in an atmosphere of carbon dioxide gas at a predetermined temperature and under a predetermined condition of pH before calcining. Thus for example, the precipitate of the hydroxides is heat aged at a temperature of from 150° C. to 250° C., preferably from 200° C. to 220° C. for a relatively long period of time, five hours for example, preferably from 20 to 50 hours. The pH of the liquid is usually maintained in a range of from 5.5 to 7.5, preferably from 6.0 to 7.0. The aging is done by putting the resulting slurry containing the gel in a sealed vessel, for example, in an autoclave, introducing carbon dioxide gas at room temperature into the vessel, preferably under a pressure of 5 to 20 kg./cm.$^2$ and maintaining the autoclave at the predetermined temperature. The reason for performing the aging in the atmosphere of carbon dioxide gas is to prevent the acid carbonate, $NH_4HCO_3$ for instance, from decomposing to increase the pH of the slurry. Although during the aging, the acid radicals which have been adsorbed by the gel are released into the liquid with the growth of the crystals, since these freed acid radicals react with the $NH_4HCO_3$ in the liquid, the pH will not be decreased. The crystals of boehmite ($Al_2O_3 \cdot H_2O$) and zinc spinel ($ZnAl_2O_4$) grow from the gel during the aging thereby completing particles having pores of the required dimension.

After cooling, the aged product is passed through a filter, for example, a suction filter to obtain a cake. If desired, the cake is washed with a dilute aqueous solution of ammonium nitrate and then dried. Thereafter, the product is calcined at a temperature of from 900° to 1,200° C. to obtain zinc spinel or zinc spinel containing alumina having a small pore radius and a sharp pore size distribution curve and containing only a small quantity of impurities. When the calcining temperature is too low, the crystals do not grow, whereas too high calcining temperature is not advantageous because α-alumina is formed. α-Alumina has different crystal structure from zinc spinel which affects the pore radius and pore size distribution.

With regard to the ratio of mixing the monobasic salts of zinc and aluminum, if the quantity of the zinc salt is too small, zinc spinel will not be formed, whereas if the quantity of the zinc salt is too large zinc oxide will also be formed in addition to zinc spinel. For this reason, the atomic ratio of zinc to aluminum is usually selected to be in a range of from about 5:95 to 33.3:66.7. At an atomic ratio of about 33.3:66.7, zinc spinel alone is obtained, whereas at lower atomic ratios zinc spinel containing η-alumina is obtained. Within the above described range, the proportion of zinc spinel increases and the pore size of the product decreases with the proportion of the zinc salt. However, at the upper limit of said range zinc spinel alone is produced. η-Alumina and zinc spinel have similar crystal structure so that it is possible to use them concurrently. However, as zinc oxide and zinc spinel have different crystal construction, coexistence thereof affects the pore radius and pore size distribution of the product.

BRIEF DESCRIPTION OF THE DRAWINGS

The invention can be more fully understood from the following detailed description taken in conjunction with the accompanying drawings in which.

DESCRIPTION OF THE PREFERRED EMBODIMENTS

Figure 1:
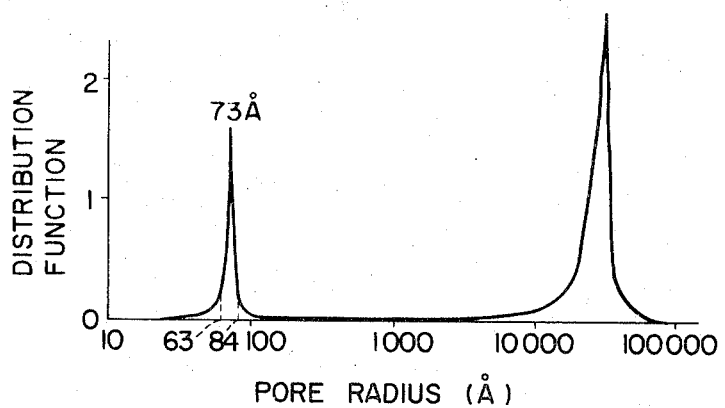
FIGS. 1 and 2 are graphs illustrating typical pore size distribution curves of the novel column packing materials for use in GPC.

Following examples are given to illustrate the invention but not to be construed as limitations.

Examples 1 to 4

Nitrates or chlorides of zinc and aluminum respectively were dissolved in water to prepare a raw material aqueous solution. Ammonium bicarbonate was dissolved in water and Dry Ice was added to the resulted solution to cause the same to absorb carbon dioxide gas until a pH of 7.4 was reached thereby preparing a precipitant. While stirring the raw material aqueous solution the precipitant was added gradually to precipitate a hydroxide in the form of a gel. The resulting precipitate was charged in an autoclave of titanium together with a mother liquor. After purging the air in the autoclave with carbon dioxide gas, the temperature of the autoclave was raised and the content was aged for 26 hours while stirred.

After cooling, the content was removed from the autoclave and passed through a suction filter to form a cake. After washing with 0.25% ammonium nitrate solution, the cake was dried and then calcined for two hours at a predetermined temperature. The following table shows the detail of the reaction, aging conditions and the properties of the product. The resulting product was zinc spinel or zinc spinel containing alumina and having a high purity, uniform pore size and desired particle size.

| Example | 1 | 2 | 3 | 4 |
|---|---|---|---|---|
| Raw material aqueous solution: | | | | |
| Nona hydrate of aluminum nitrate (g.) | 864 | 1,000 | 1,240 | |
| Hexahydrate of aluminum chloride (g.) | | | | 887 |
| Hexahydrate of zinc nitrate (g.) | 328 | 300 | 109 | |
| Zinc chloride (g.) | | | | 26.3 |
| Water (l.) | 3.26 | 3.26 | 3.26 | 3.26 |
| Al:Zn (atomic ratio) | 70:30 | 72.5:27.5 | 90:10 | 95:5 |
| Precipitant: | | | | |
| Ammonium bicarbonate (g.) | 1,100 | 1,100 | 1,100 | 1,030 |
| Water (l.) | 12.7 | 11.7 | 12.7 | 14.7 |
| Aging condition: | | | | |
| Temperature (° C.) | 212 | 215 | 210 | 200 |
| Time (hr.) | 26 | 26 | 26 | 50 |
| pH before aging | 6.41 | 6.48 | 6.42 | 6.05 |
| pH after aging | 7.02 | 7.12 | 6.90 | 6.45 |
| Calcination: Temperature (° C.) | 1,000 | 1,000 | 1,080 | 1,100 |
| Calcined product: | | | | |
| Weight (g.) | 205 | 201 | 194 | 193 |
| Content of zinc (weight percent) | 29.2 | | 11.0 | |
| Bulk density (g./ml.) | 1.60 | 1.60 | 1.22 | 0.85 |
| Specific surface area (m.$^2$/g.) | 25.9 | 43.4 | 39.4 | 46.8 |
| Pore radius (A.) | 73 | 52 | 110 | 170 |
| Particle size (μ) | 15–40 | 15–40 | 15–40 | 15–40 |
| Porosity (ml./g.): | | | | |
| γ<75,000 A | 0.53 | 0.45 | 0.71 | 1.25 |
| γ<1,000 A | 0.12 | 0.12 | 0.23 | 0.43 |

The X-ray diffraction of the calcined product was measured and the result showed that the products of Examples 1 and 2 contained only zinc spinel ($ZnAl_2O_4$), whereas the products of Examples 3 and 4 mixtures of η-alumina and zinc spinel. The pore size distributions of the calcined products of Examples 1 and 3 are shown by FIGS. 1 and 2, respectively.

Figure 2:
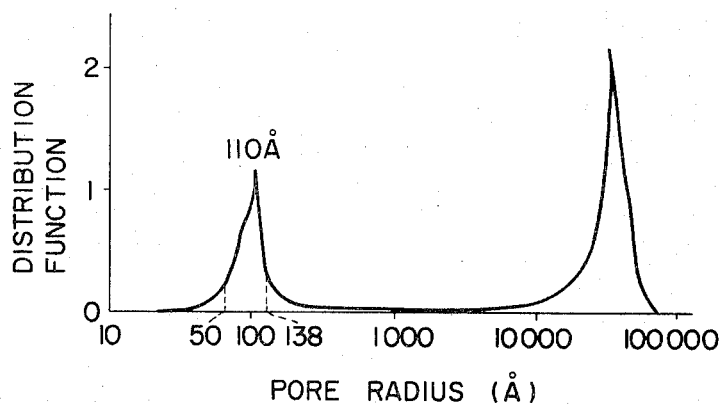

In these drawings, the ordinate represents the distribution function and the abscissa the pore radius in angstrom units. Sharp peaks appearing near 73 A. and 110 A. represent the effective pore size, whereas the peaks appearing in a range of from 10,000 to 100,000 A. represents the interstices between particles which do not contribute to the separation. As can be noted from these figures, the novel column packing material of this invention has a small pore size and a sharp pore size distribution. The ratio between the peak pore size and the bottom extent of the pore size distribution equals $$\frac{84-63}{73} \times 3 = 0.9$$

in the case shown in FIG. 1, whereas equals $$\frac{138-50}{110} \times 3 = 2.4$$

in the case of FIG. 2. Accordingly, the column packing material of this invention is especially suitable for the measurement of the molecular weight in a range of low molecular weights. Further, it is possible to obtain an adequate pore size by adjusting the proportions of zinc and aluminium.

Following examples show applications of the products obtained by Examples 1 to 4.

Example 5

Figure 3:
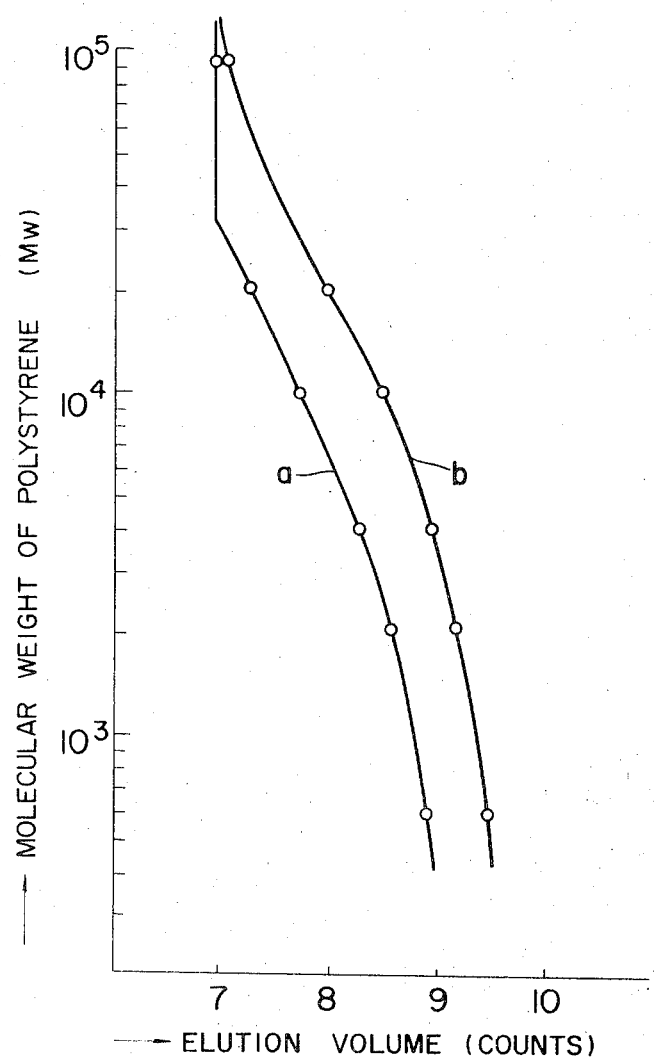
FIGS. 3, 6 and 10 are graphs showing calibration curves of the novel column packing material.

The zinc spinel and the zinc spinel containing alumina were respectively filled in stainless steel tubes, each having an inner diameter of 7.9 mm. and a length of 1,220 mm. thus providing packed columns for use in GPC. By using each one of these columns, the calibration curves of a 0.1% tetrahydrofuran solution of polystyrenes having different molecular weights were measured at a temperature of 21° C. and at a flow rate of 1 ml./min. Curve $a$ in FIG. 3 shows the calibration curve of the zinc spinel prepared by Example 2, whereas curve $b$ that of the zinc spinel containing alumina and prepared by Example 4. In FIG. 3, the ordinate represents the weight average molecular weight of the polystyrene to be permeated and the abscissa the elution volume wherein 5 ml. of the solution was taken as one count.

Example 6

Figure 4:
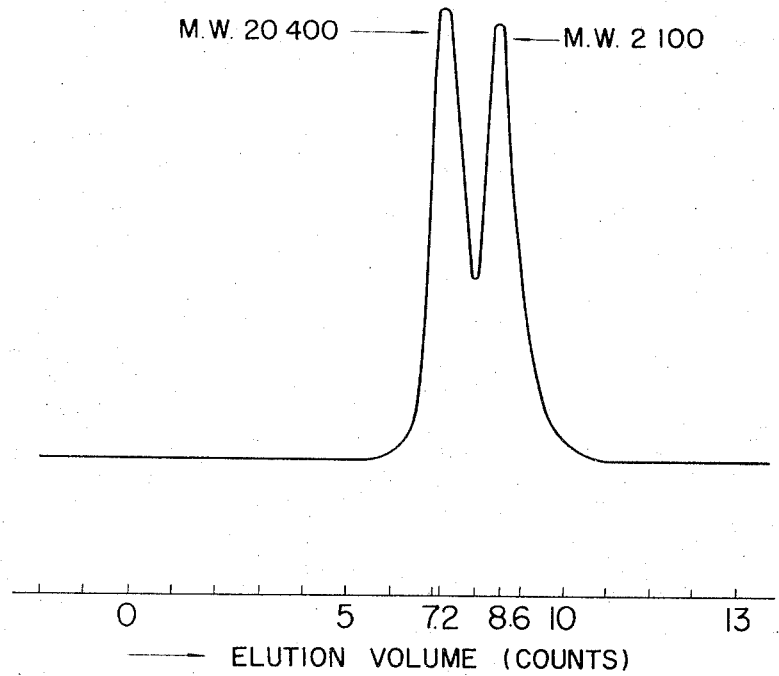
FIGS. 4, 5, 7 and 8 are graphs showing the result of the measurement of a molecular weight distributions with columns packed with novel column packing materials.

Polystyrenes having narrow molecular weight distributions and weight average molecular weights of 20,400 and 2,100 respectively were dissolved in tetrahydrofuran respectively to obtain a 0.1% solution in each case, and the resulting solutions were mixed with each other. The distribution function of the mixed solution was measured by using a column corresponding to curve $a$ shown in FIG. 3. An elution characteristic as shown in FIG. 4 was obtained. This shows that the novel column packing material has an ability of sharp separation down to a range of low molecular weight.

Example 7

49 gr. of the zinc spinel containing $\eta$-alumina and prepared by Example 4 was packed in a stainless steel column having an inner diameter of 7.9 mm. and a length of 1,220 mm. to obtain a GPC column. Three such columns were connected in series and a 0.2% tetrahydrofuran solution of a polyethylene glycol (having a molecular weight $\overline{M}_w = 45,000$, measured by the viscosity method) was passed through these columns at a rate of 1.0 ml./min. and at room temperature to measure the molecular weight distribution. The result of measurement is shown in FIG. 5.

Figure 5:
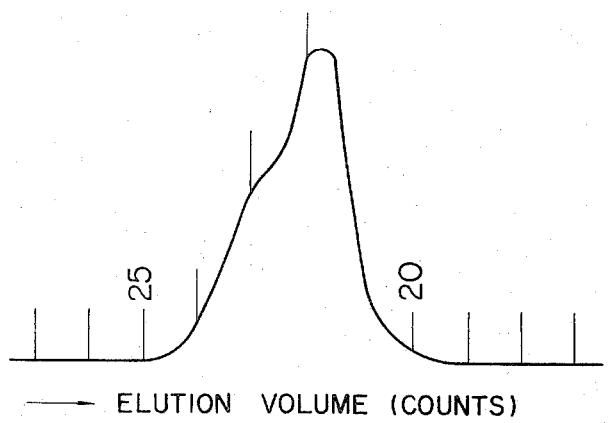

From FIG. 5 it will be noted that the peak of the elution volume of this sample appears at 22 counts, that is about 7.3 counts per column. By using calibration curve $b$ shown in FIG. 3, it can be shown that an elution volume of 7.3 corresponds to a molecular weight of about 50,000.

Example 8

3.5 parts, by weight, of the zinc spinel containing $\eta$-alumina and obtained by Example 3, and 1 part, by weight, of $\theta$-alumina prepared by the steps described below were mixed together in water. More particularly, the steps of Example 1 were repeated except that only nonahydrate of aluminum nitrate was used as the raw material and that the aging was performed for 50 hours at a temperature of 191° C. The resulting boehmite was calcined for 2 hours at a temperature of 1,150° C., the $\theta$-alumina utilized in this example having following properties: a bulk density of 0.44 g./ml., a specific surface area of 27.1 m.²/g., a pore radius of 650 A., a pore volume of 2.41 ml./g. at a pore radius of from 18 to 75,000 A., a pore volume of 1.19 ml./g. at a pore radius of from 18 to 5,000 A., and a pore size distribution curve having a sharp peak at a position of a radius of 650 A. The mixture in water was washed with ethanol, filtered, dried and further dried under a reduced pressure and at a temperature of 90° C. The dry mixture had a bulk density of 0.89 g./ml., a specific surface area of 49.1 m.²/g., significant pore sizes of 110 A. and 680 A. (in radius), a pore volume of 1.07 ml./g. at a radius of from 18 to 75,000 A., a pore volume of 0.45 ml./g. at a radius of from 18 to 5,000 A. and a pore size distribution curve having two sharp peaks at radii of 57 A. and 680 A., respectively.

Figure 7:
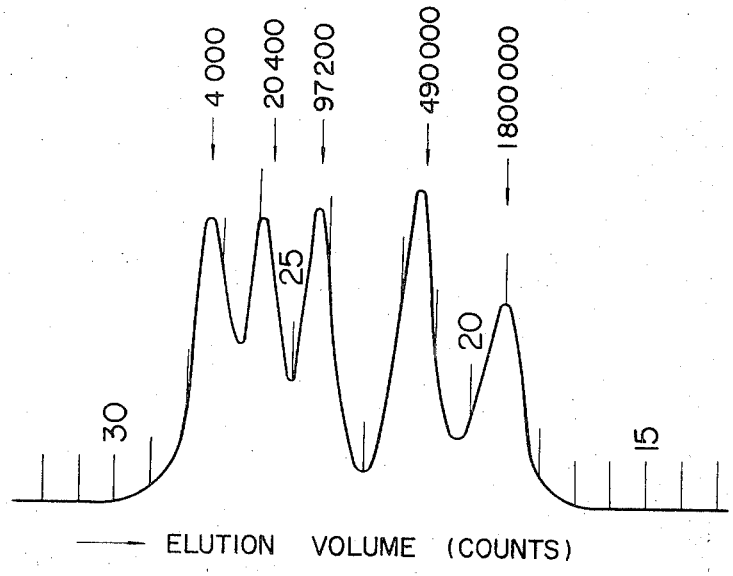
Figure 8:
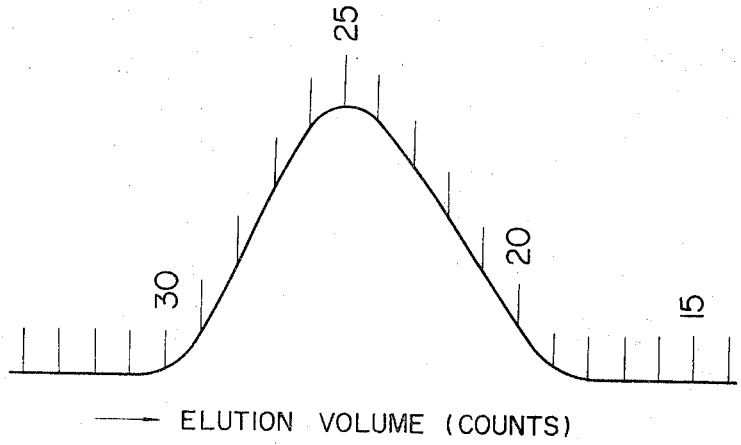

This mixture was packed in a stainless steel column having an inner diameter of 7.9 mm. and a length of 1,220 mm. to obtain a GPC column. A 0.05% tetrahydrofuran solution of a polystyrene mixture of different molecular weights was passed through this column at a rate of 1.0 ml./min. and at a temperature of 25° C. to obtain a calibration curve shown in FIG. 6. In the drawing, one count on the abscissa corresponds to 5 ml. of the elution volume. FIG. 7 shows a molecular weight distribution curve of a mixed sample consisting of a standard polystyrene measured by using these columns each packed with the mixture and at a flow rate of 1.0 ml./min. The standard polystyrene was manufactured by Pressure Chemical in Pittsburgh, U.S.A. and the concentration of the tetrahydrofuran solution was 0.05%, by weight. FIG. 8 shows a molecular weight distribution curve of a polyvinyl chloride obtained in the same manner by using the column packed with the mixture. The pressure drop of this column was 3.6 kg./cm. per one column.

Figure 9:
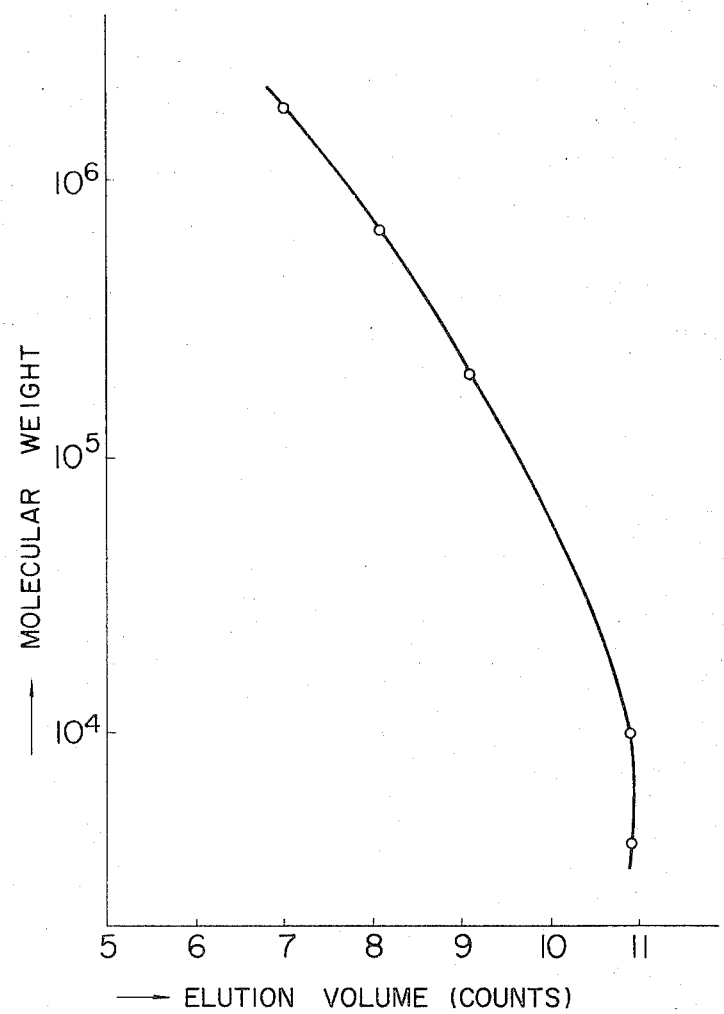
FIG. 9 shows one example of a calibration curve where a column containing only θ-alumina is used.
Figure 10:
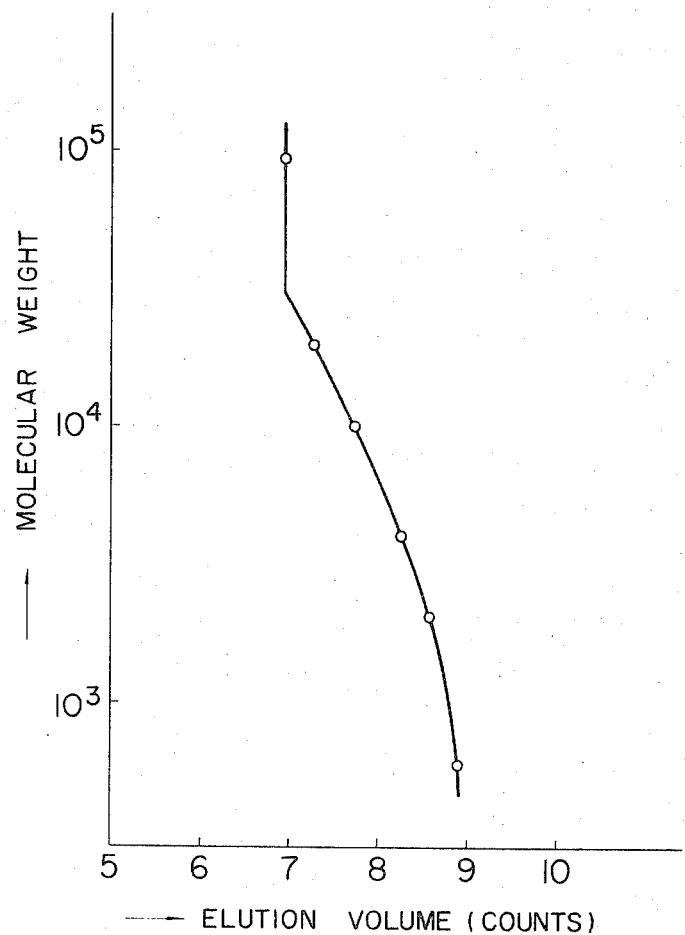

For comparison, one GPC column of stainless steel having an inner diameter of 7.9 mm. and a length of 1220 mm. was packed with above described zinc spinel containing $\gamma$-alumina and the other GPC column of the same dimension with the $\theta$-alumina prepared as above described. Each GPC column was used to obtain a calibration curve. FIG. 9 shows a calibration curve obtained by using the GPC column packed with $\theta$-alumina, whereas FIG. 10 shows that obtained by using the GPC column packed with the zinc spinel containing $\gamma$-alumina. The pressure drop of the former column was 2.8 kg./cm.² while that of the latter was 6.0 kg./cm.².

Figure 6:
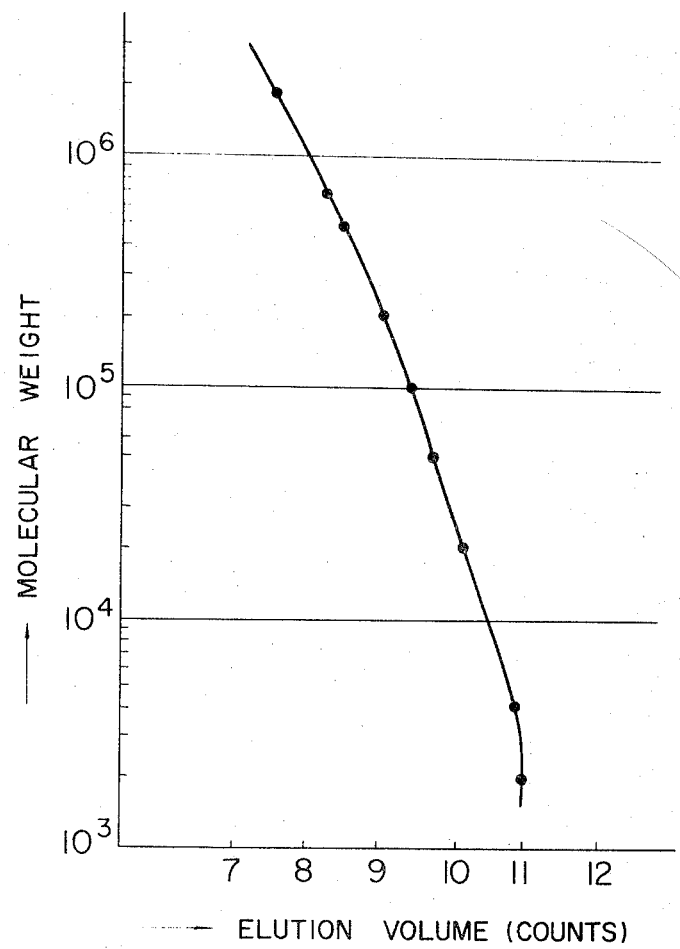

As can be noted from FIG. 10, the zinc spinel containing $\gamma$-alumina does not manifest a separation ability or resolving power at a molecular weight of about 1,800,000 but the combined GPC columns manifest the separation ability or resolving power at a molecular weight of about 1,800,000 as shown in FIG. 6. The slope of the calibration curve near this value of the molecular weight is caused by the $\theta$-alumina used. Comparison of FIGS. 6 and 9 shows that the separation ability or resolving power of the $\theta$-alumina of the mixed column does not decrease in proportion to the degree of dilution with zinc spinel containing $\eta$-alumina.

Figure 11:
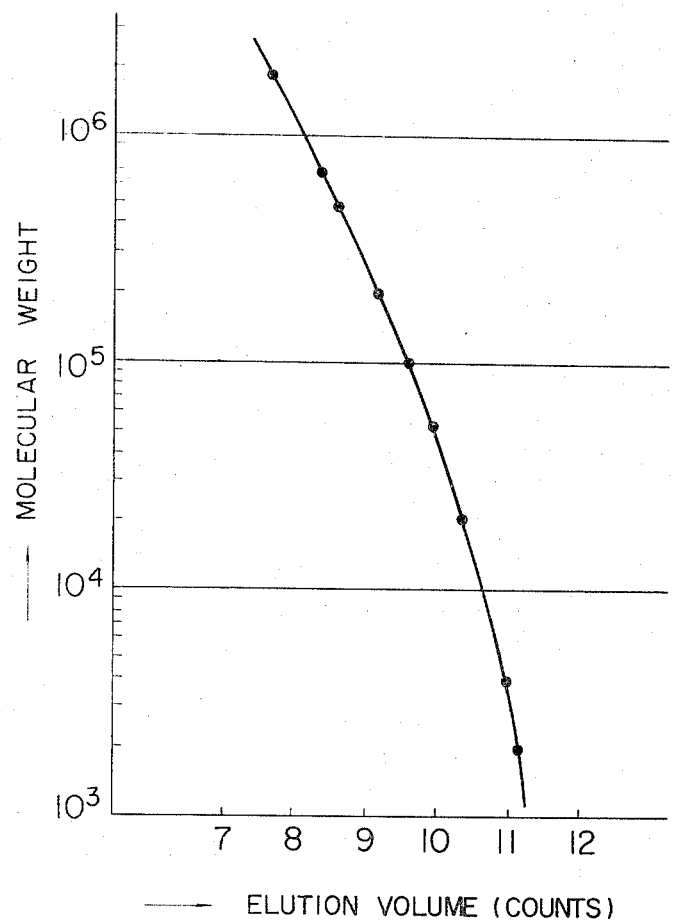
FIGS. 11 and 12 are graphs respectively showing a calibration curve and a molecular weight distribution curve obtained by using a column packed with θ-alumina and a column packed with the novel column packing material which are connected in series.
Figure 12:
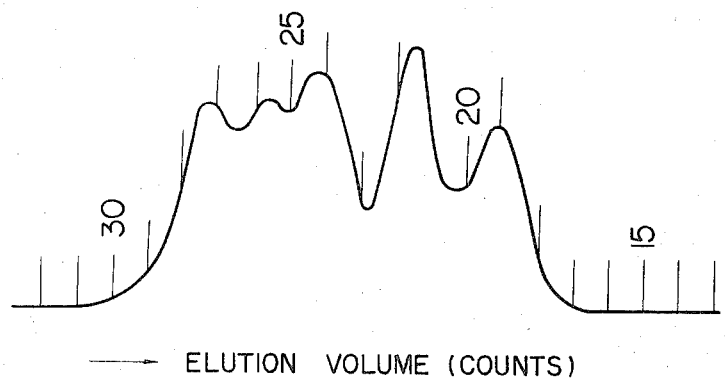

For another comparison, one stainless column having an inner diameter of 7.9 mm. and a length of 910 mm. was packed with the above described $\theta$-alumina and three stainless columns of the same dimension were packed with the zinc spinel containing $\eta$-alumina mentioned above. These four columns were connected in series and a 0.05%, by weight, tetrahydrofuran solution of polystyrenes of different molecular weight was passed through the columns at a rate of 1 ml./min. and at a temperature of 25° C. and obtained a calibration curve as shown in FIG. 11. In this case, elution counts were obtained by dividing the experimental value by $$\frac{910 \times 4}{1220} = 3,$$

for the purpose of obtaining a calibration curve of similar configuration. Although the calibration curve shown in FIG. 11 is similar to that of the mixed column of this invention shown in FIG. 6, the pressure drop of this case was 5.2 kg./cm.² per one column having a length of 1,220 mm., which is much larger than the pressure drop 3.6 kg./cm.² of the column embodying the invention. FIG. 12 shows a molecular weight distribution curve of a standard polystyrene mixture sample obtained in the same manner by using the serially connected columns described above. Comparison of FIGS. 7 and 12 clearly shows that the mixed columns of this invention provide much higher degree of separation with the same length of the columns.

Although the column packing material shown in Example 8 comprises zinc spinel containing $\eta$-alumina it will be clear that it may comprise zinc spinel alone.

What is claimed is:

1. A method for manufacturing zinc spinel or a mixture of zinc spinel and $\eta$-alumina having pores of uniform radius and adapted for use in gel permeation chromatography, comprising the steps of treating a mixed solution of a zinc salt and an aluminum salt of a monobasic acid selected from the group consisting of chlorides and nitrates of said metals with a solution of an acid carbonate selected from the group consisting of ammonium bicarbonate and sodium bicarbonate to precipitate aluminum hydroxide gel and zinc hydroxide gel, the atomic ratio of zinc to aluminum in said mixed solution being in the range of from 5:95 to 33.3:66.7; heat aging said precipitate in the presence of pressurized carbon dioxide for at least 5 hours at a temperature of from 150° to 250° C. and at a pH of from 5.5 to 7.5, and then calcining the heat aged precipitate at a temperature of from 900 to 1200° C. to produce zinc spinel or zinc spinel containing $\eta$-alumina having a similar crystal structure to that of said zinc spinel.

2. The method according to claim 1 wherein the quantity of said acid carbonate incorporated is 10 to 40% excess of the theoretical value.

3. Zinc spinel obtained by the method of claim 1.

4. A mixture of zinc spinel and $\eta$-alumina obtained by the method of claim 1.

5. The packing material obtained by the method of claim 1 wherein said material has a pore size distribution peak ranging from 20 to 300 angstrom units and a ratio of the bottom extent as defined above of the sharp portion of the pore size distribution curve to the distribution peak of less than 5.0.

6. The packing material obtained by the method of claim 5 wherein said packing material has a ratio of the bottom extent of the sharp portion of the pore size distribution curve to the distribution peak of less than 3.0.

7. The packing material obtained by the method of claim 5 wherein the pore size of said material is from 40 to 200 angstrom units in radius.

8. The packing material obtained by the method of claim 7, wherein the pore size of said material is from 40 to 80 angstrom units in radius.

References Cited

UNITED STATES PATENTS

| | | | |
|---|---|---|---|
| 3,141,729 | 7/1964 | Clarke et al. | 252—463 X |
| 2,413,184 | 12/1946 | La Lande | 252—463 X |
| 2,623,020 | 12/1952 | Gilbert | 252—463 |
| 3,641,182 | 2/1972 | Box et al. | 252—466 PT |
| 3,478,009 | 11/1969 | Genge | 252—463 X |

PATRICK P. GARVIN, Primary Examiner

W. J. SHINE, Assistant Examiner

U.S. Cl. X.R.

423—600